US011724546B2

(12) United States Patent
Sakamoto

(10) Patent No.: US 11,724,546 B2
(45) Date of Patent: Aug. 15, 2023

(54) PNEUMATIC TIRE

(71) Applicant: The Yokohama Rubber Co., LTD., Tokyo (JP)

(72) Inventor: Yousuke Sakamoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 349 days.

(21) Appl. No.: 16/962,811

(22) PCT Filed: Dec. 27, 2018

(86) PCT No.: PCT/JP2018/048196
§ 371 (c)(1),
(2) Date: Jul. 16, 2020

(87) PCT Pub. No.: WO2019/142643
PCT Pub. Date: Jul. 25, 2019

(65) Prior Publication Data
US 2021/0362550 A1 Nov. 25, 2021

(30) Foreign Application Priority Data
Jan. 16, 2018 (JP) ................. 2018-004778

(51) Int. Cl.
*B60C 11/01* (2006.01)
*B60C 11/11* (2006.01)
(Continued)

(52) U.S. Cl.
CPC .......... *B60C 11/01* (2013.01); *B60C 11/0304* (2013.01); *B60C 11/0306* (2013.01);
(Continued)

(58) Field of Classification Search
CPC . B60C 11/01; B60C 11/1236; B60C 11/1625; B60C 11/1204; B60C 11/11;
(Continued)

(56) References Cited

U.S. PATENT DOCUMENTS 4,690,189 A * 9/1987 Bradisse ................. B60C 11/11
152/209.15
6,105,643 A 8/2000 Rohweder et al.
(Continued)

FOREIGN PATENT DOCUMENTS

| CN | 106660403 | 5/2017 |
| CN | 107206848 | 9/2017 |

(Continued)

OTHER PUBLICATIONS

Machine translation for Japan 2009-220628 (Year: 2022).*
International Search Report for International Application No. PCT/JP2018/048196 dated Apr. 9, 2019, 4 pages, Japan.

*Primary Examiner* — Steven D Maki
(74) *Attorney, Agent, or Firm* — Thorpe North & Western

(57) ABSTRACT

In a pneumatic tire, a tread portion is provided with center blocks and shoulder blocks, and sidewall portions are each provided with side blocks. Surfaces of the blocks are provided with groove elements each including a narrow groove and/or a sipe. The first groove elements provided in the side blocks, the second groove elements provided in the shoulder blocks, and the third groove elements provided in the center blocks form a set of lateral groove group extending continuously from the side block on a first side to the side block on a second side in the tire lateral direction along the blocks across a main groove or an auxiliary groove.

12 Claims, 3 Drawing Sheets

(51) Int. Cl.
B60C 11/12 (2006.01)
B60C 11/03 (2006.01)
B60C 11/16 (2006.01)

(52) U.S. Cl.
CPC ........... B60C 11/11 (2013.01); B60C 11/1204 (2013.01); B60C 11/1236 (2013.01); B60C 11/1625 (2013.01); B60C 2011/013 (2013.01); B60C 2011/036 (2013.01); B60C 2011/0381 (2013.01); B60C 2011/1213 (2013.01); B60C 2200/14 (2013.01)

(58) Field of Classification Search
CPC ......... B60C 11/0304; B60C 2011/1213; B60C 2011/036; B60C 2011/0381; B60C 2011/013
See application file for complete search history.

(56) References Cited

U.S. PATENT DOCUMENTS

| | | | |
|---|---|---|---|
| 2001/0022209 A1* | 9/2001 | Chaen | B60C 11/12 152/151 |
| 2008/0210355 A1* | 9/2008 | Harvey | B60C 11/01 152/209.8 |
| 2013/0139936 A1 | 6/2013 | Ohara | |
| 2016/0280013 A1 | 9/2016 | Jacobs et al. | |
| 2017/0182850 A1 | 6/2017 | Nakamura | |
| 2017/0210181 A1 | 7/2017 | Yamaguchi et al. | |
| 2018/0009267 A1 | 1/2018 | Takahashi | |
| 2018/0043737 A1 | 2/2018 | Akashi | |
| 2018/0065417 A1 | 3/2018 | Hoshiba | |
| 2019/0176531 A1 | 6/2019 | Murata | |
| 2019/0263189 A1 | 8/2019 | Jacobs et al. | |
| 2022/0118796 A1* | 4/2022 | Sakamoto | B60C 11/01 |

FOREIGN PATENT DOCUMENTS

| | | |
|---|---|---|
| DE | 10 2016 215 776 | 3/2018 |
| JP | S62-184903 | 8/1987 |
| JP | H06-171321 | 6/1994 |
| JP | 2009-220628 A * | 10/2009 |
| JP | 2012-183949 | 9/2012 |
| JP | 2013-119277 | 6/2013 |
| JP | 2014-181021 | 9/2014 |
| JP | 2016-150603 | 8/2016 |
| JP | 2017-114384 | 6/2017 |
| JP | 2018-002104 | 1/2018 |
| WO | WO 97/27070 | 7/1997 |
| WO | WO 2015/073315 | 5/2015 |
| WO | WO 2016/013602 | 1/2016 |
| WO | WO 2016/132971 | 8/2016 |
| WO | WO 2016/143642 | 9/2016 |
| WO | WO 2017/071843 | 5/2017 |
| WO | WO 2017/208863 | 12/2017 |
| WO | WO 2019/026759 | 2/2019 |

* cited by examiner

PNEUMATIC TIRE

TECHNICAL FIELD

The present technology relates to a pneumatic tire suitable as a tire for driving on unpaved roads, and in particular, to a pneumatic tire that provides efficiently enhanced running performance on unpaved roads.

BACKGROUND ART

For pneumatic tires intended for driving on unpaved roads such as uneven ground, muddy ground, snowy roads, sandy ground, and rocky areas, a tread pattern is generally employed that is based on lug grooves or blocks including many edge components and that has a large groove area. For such a tire, running performance on unpaved roads is improved by biting into mud, snow, sand, stone, rock, or the like on a road surface (hereinafter, referred to collectively as "mud or the like") to achieve traction performance and preventing grooves from being blocked with mud or the like. In particular, there has been a proposal that running performance on unpaved roads be enhanced by also providing blocks in side regions of a tread portion located outward from shoulder regions of the tread portion in the tire lateral direction (outward from ground contact edges in the tire lateral direction) (see Japan Unexamined Patent Publication Nos. 2016-150603 and 2013-119277, for example).

A comparison between the tires in Japan Unexamined Patent Publication Nos. 2016-150603 and 2013-119277 indicates that the tire in Japan Unexamined Patent Publication No. 2016-150603 has a relatively small groove area and includes relatively insignificant recesses and protrusions in the side regions and can thus be said to be of a type that also takes the running performance on paved roads into account. On the other hand, the tire in Japan Unexamined Patent Publication No. 2013-119277 has a large groove area and includes large individual blocks and emphasized recesses and protrusions in the side regions, and can thus be said to be of a type focused on the running performance on unpaved roads. Thus, the former tends to deliver lower running performance on the unpaved road than the latter, and the latter tends to deliver lower performance under normal travel conditions (for example, noise performance) than the former. In recent years, performance required for tires has been increasingly diversified, there has also been a demand for a tire for driving on unpaved roads which delivers performance at a level intermediate between the performance levels of the above-described two types of tires, and there has been a demand for measures for efficiently enhancing the running performance on unpaved roads using an appropriate groove shape.

SUMMARY

The present technology provides a pneumatic tire providing efficiently enhanced running performance on unpaved roads.

A pneumatic tire according to an embodiment of the present technology is a pneumatic tire comprising a tread portion extending in a tire circumferential direction and having an annular shape, a pair of sidewall portions disposed on both sides of the tread portion, and a pair of bead portions disposed inward of the sidewall portions in a tire radial direction. The tread portion is provided with a pair of main grooves located on both sides of a tire equator and extending in the tire circumferential direction, lug grooves extending outward from each of the pair of main grooves in the tire lateral direction beyond a ground contact edge defining, into a plurality of shoulder blocks, a corresponding one of land portions located outward of the pair of main grooves in the tire lateral direction, and auxiliary grooves defining a land portion between the pair of main grooves into a plurality of center blocks, the tread portion is also provided with a plurality of side blocks formed raised from a surface of each of the pair of sidewall portions at positions adjacent to and outward of the shoulder blocks in the tire lateral direction. Surfaces of the side blocks are provided with first groove elements each including a narrow groove and/or a sipe, surfaces of the shoulder blocks are provided with second groove elements each including a narrow groove and/or a sipe, and surfaces of the center blocks are provided with third groove elements each including a narrow groove and/or a sipe. Each of the first groove element extends from the corresponding sidewall portion toward the ground contact edge, each of the second groove elements extends continuously from the first groove elements and from a side surface of the corresponding shoulder block closer to the ground contact edge toward a road contact surface to communicate with the main groove, and each of the third groove elements extends across the corresponding center block to communicate with a main groove of the pair of main grooves or the auxiliary groove. The first groove elements and the second groove elements and the third groove elements forming a set of lateral groove group extending continuously from the side block on a first side to the side block on a second side in the tire lateral direction along the blocks across the pair of main grooves or the auxiliary groove.

In an embodiment of the present technology, the tread pattern based on the blocks as described above is provided with the set of lateral groove group continuously extending from the side block on the first side to the side block on the second side in the tire lateral direction along the blocks. Thus, the embodiment of the present technology can ensure an edge effect by the set of lateral groove group corresponding to an aggregate of the first to third groove elements, allowing improvement of running performance on unpaved roads. In this case, each individual groove element (each of the first to third groove elements) includes the narrow groove or sipe, which has a sufficiently smaller groove area than the lug grooves and the like, and thus does not become a factor significantly increasing the groove area of the entire tread pattern or affect tire performance under normal travel conditions. Thus, the running performance on unpaved roads can be efficiently enhanced.

In an embodiment of the present technology, preferably, the lateral groove group includes a first lateral groove group and a second lateral groove group that have different overall shapes, the first lateral groove group extends generally inclined in one direction with respect to the tire lateral direction, and the second lateral groove group is generally folded due to bending of second groove elements or the third groove elements and includes a portion extending in the tire circumferential direction. By complicating the overall shape of the lateral groove groups in this way, the overall length of the set of lateral groove group can be extended, and the number of lateral components or circumferential components can be increased. Thus, the edge effect can be more efficiently enhanced and the running performance on unpaved roads can be improved.

In this case, preferably, the first lateral groove groups and the second lateral groove groups are disposed alternately in the tire circumferential direction, and a portion of the second lateral groove group that extends in the tire circumferential direction intersects with the first lateral groove group. Thus, the overall structure of the lateral groove group is optimized, and this is advantageous for efficiently enhancing the running performance on unpaved roads.

In this case, preferably, a shoulder block in which the second groove element included in the first lateral groove group is formed lies adjacent, in the tire circumferential direction, to a shoulder block in which the second groove element included in the second lateral groove group is formed, these two shoulder blocks form a pair, and the pairs of the shoulder blocks are repeatedly arranged in the tire circumferential direction. Accordingly, the shoulder blocks have appropriate rigidity and appropriate balance with the lateral grooves (second groove elements) not only for the individual shoulder blocks but also for the shoulder block pairs, and this is advantageous for efficiently enhancing the running performance on unpaved roads.

Additionally, preferably, a side block in which the first groove element included in the first lateral groove group is formed lies adjacent, in the tire circumferential direction, to a side block in which the first groove element included in the second lateral groove group is formed, and these two side blocks form a pair, and the pairs of the side blocks are repeatedly arranged in the tire circumferential direction. Accordingly, the side blocks have appropriate rigidity and appropriate balance with the lateral grooves (second groove elements) not only for the individual side blocks but also for the side block pairs, and this is advantageous for efficiently enhancing the running performance on unpaved roads.

In an embodiment of the present technology, preferably, each of the side blocks on the first side in the tire lateral direction and each of the side blocks on the second side in the tire lateral direction have different shapes. Accordingly, each of the side blocks on the first side and each of the side blocks on the second side differ in the manner of contact with road surfaces (in the manner of biting into the road surfaces), and this acts effectively on irregular recesses and protrusions on unpaved roads, and is thus advantageous for efficiently enhancing the running performance on unpaved roads.

In an embodiment of the present technology, preferably, the second groove element and the third groove element are each a composite groove including a sipe and a narrow groove coupled together, and in each composite groove, the sipe is disposed closer to the tire equator, and the narrow groove is disposed outward in the tire lateral direction. Accordingly, in a case where the lateral groove group is traced from the side block on the first side to the side block on the second side, the sipes and the narrow grooves, having different groove forms, are alternately repeated, complicating the overall shape of the lateral groove group. This is advantageous for efficiently enhancing the running performance on unpaved roads.

In an embodiment of the present technology, the shoulder block or the side block may be specified to include a hole in which a stud pin is embedded.

In an embodiment of the present technology, "ground contact edges" refer to both ends, in a tire axial direction, of a grounding region formed in a case where the tire is mounted on a regular rim and inflated to a regular internal pressure, and placed perpendicularly upon a flat surface with a regular load applied to the tire. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO (The European Tyre and Rim Technical Organisation). In the system of standards, including standards with which tires comply, "regular internal pressure" is air pressure defined by each of the standards for each tire and is referred to as "maximum air pressure" in the case of JATMA, the maximum value being listed in the table "TIRE ROAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle. "Regular load" refers to a load defined by standards for each tire according to a system of standards that includes standards on which the tire is based, refers to the maximum load capacity in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. In a case where the tire is for use with a passenger vehicle, a load corresponding to 88% of the loads described above is used.

BRIEF DESCRIPTION OF DRAWINGS

FIG. 3A illustrates a first lateral groove group, and FIG. 3B illustrates a second lateral groove group.

DETAILED DESCRIPTION

Configurations of embodiments of the present technology will be described in detail below with reference to the accompanying drawings.

Figure 1:
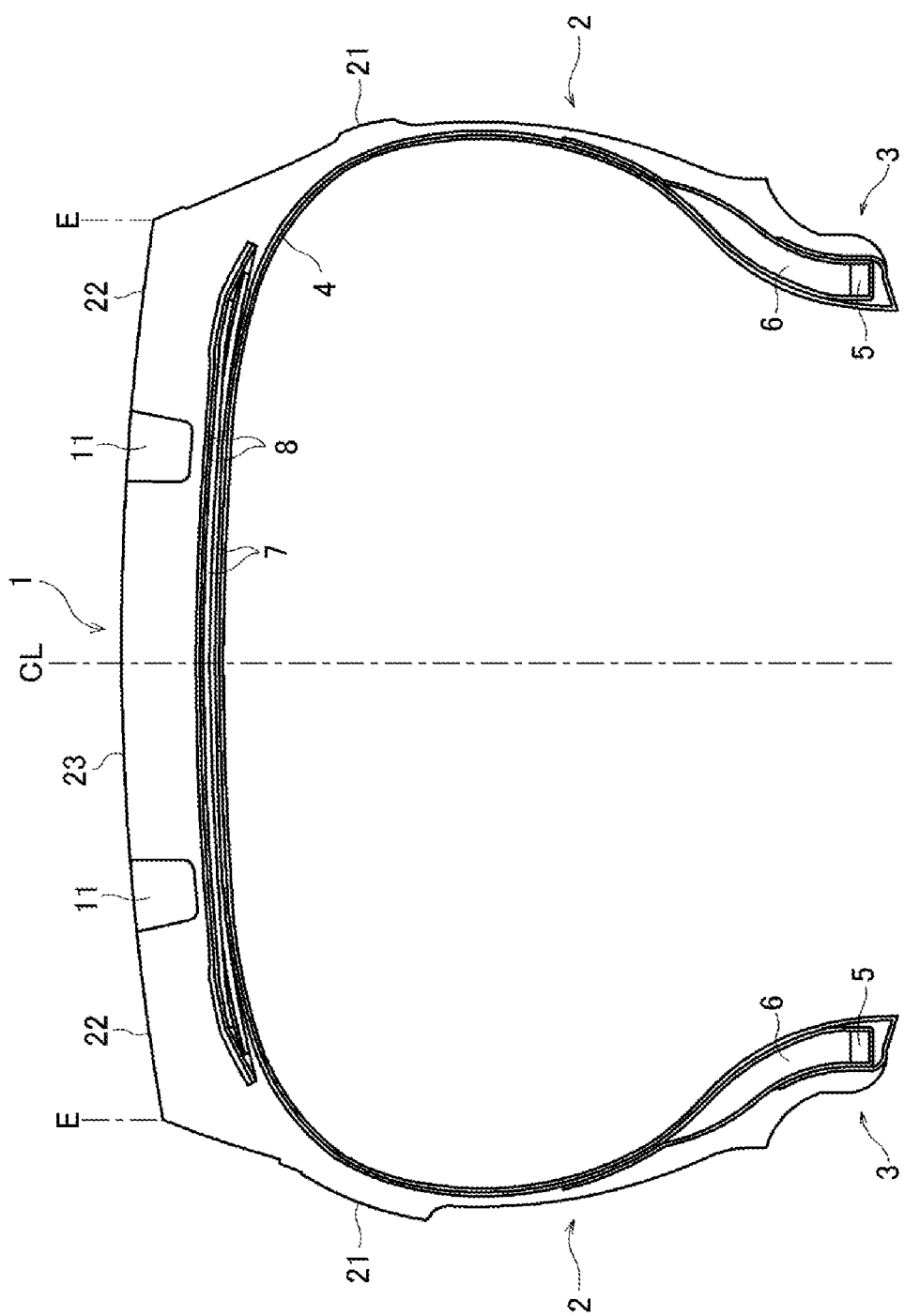
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed inward of the sidewall portions 2 in the tire radial direction. Note that, in FIG. 1, reference sign "CL" denotes a tire equator, and reference sign "E" denotes a ground contact edge. Note that the tread portion 1, the sidewall portion 2, and the bead portion 3 each extend in the tire circumferential direction to form an annular shape, thus providing a toroidal shape basic structure of the pneumatic tire, though this is not illustrated in FIG. 1 because FIG. 1 is a meridian cross-sectional view. The description using FIG. 1 is basically based on a meridian cross-sectional shape. However, each of the tire components extends in the tire circumferential direction to form an annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

An embodiment of the present technology is applied to a pneumatic tire with a general sectional structure. However, the basic structure of the pneumatic tire is not limited to the one described above.

Figure 2:
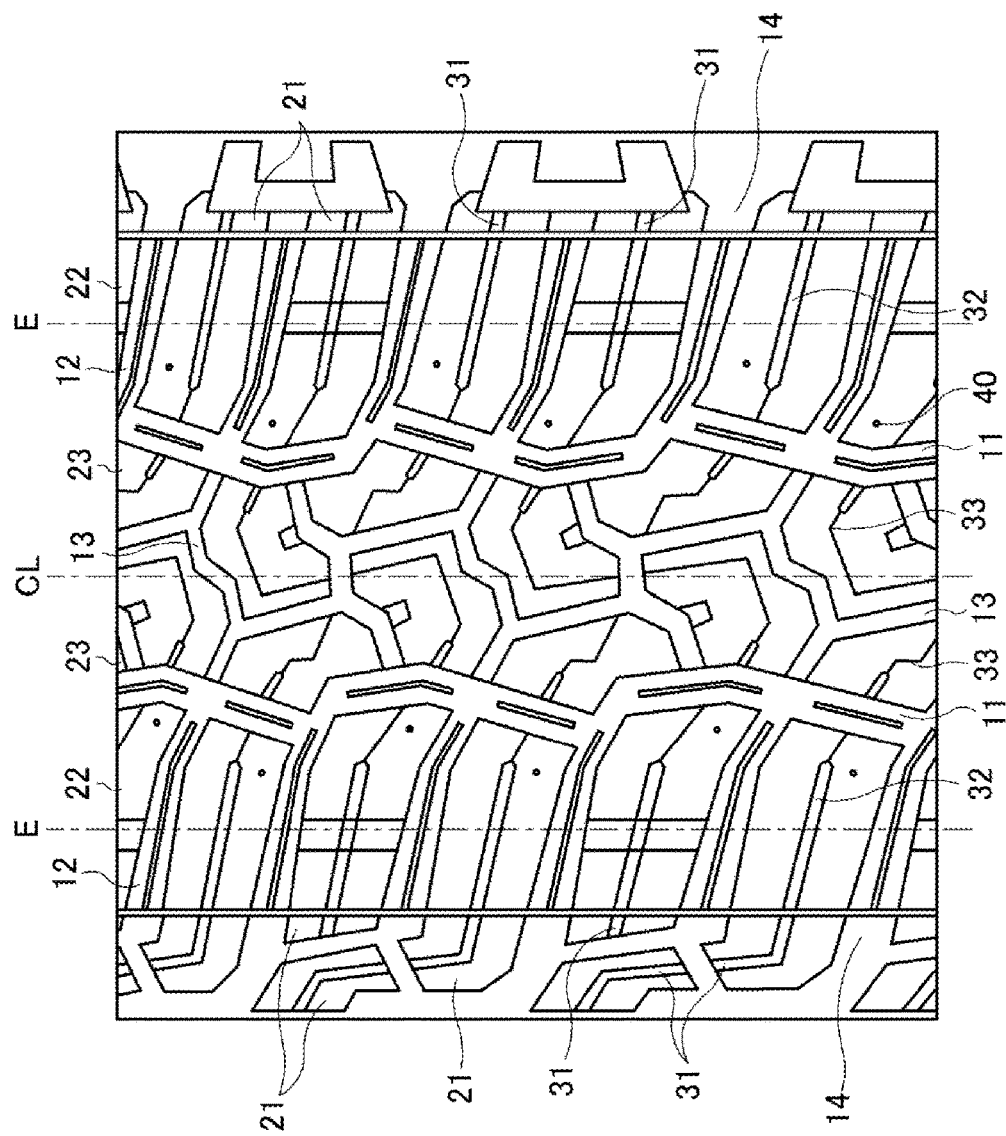
FIG. 2 is a front view illustrating a tread surface of a pneumatic tire according to an embodiment of the present technology.

As illustrated in FIG. 2, a surface of the tread portion 1 of the pneumatic tire according to an embodiment of the present technology is provided with a pair of main grooves 11 extending in the tire circumferential direction on both sides of a tire equator CL. Each of the main grooves 11 has a groove width of, for example, from 12 mm to 22 mm and a groove depth of from 12 mm to 18 mm, and preferably bends along the tire circumferential direction and extends in a zigzag manner.

A shoulder region located outward of the main groove 11 in the tire lateral direction is provided with lug grooves 12 extending in the tire lateral direction. Each of the lug grooves 12 has a groove width of, for example, from 9 mm to 15 mm, a groove depth of, for example, from 12 mm to 18 mm, and the groove width and groove depth of the lug grooves 12 are equivalent to or smaller than the groove width and groove depth of the main grooves 11. Each of the lug grooves 12 at one end communicates with the main groove 11, and is at the other end open outward in the tire lateral direction beyond the ground contact edge E. Accordingly, a land portion in the shoulder region is defined into a plurality of shoulder blocks 22 arranged in the tire circumferential direction.

A center region located between the pair of main grooves 11 is provided with auxiliary grooves 13 that define a land portion in the center region into a plurality of center blocks 23. Each of the auxiliary grooves 13 has a groove width of, for example, from 4 mm to 12 mm and a groove depth of, for example, from 10 mm to 16 mm, and has a smaller groove width and a smaller groove depth than that of the main grooves 11 and the lug grooves 12. For example, in the illustrated example, a first auxiliary groove 13 is provided that at both ends communicates with the main groove 11 and that extends in the tire lateral direction, and a second auxiliary groove 13 is provided that extends in the tire circumferential direction to connect the first auxiliary grooves 13 adjacent to each other in the tire circumferential direction. The land portion in the center region is defined into a plurality of center blocks 23 arranged all along the circumference of the tire in two rows arranged in the tire lateral direction.

In addition, a plurality of side blocks 21 formed raised from the surface of each sidewall portion 2 are provided at positions outward of and adjacent to the corresponding shoulder block 22 in the tire lateral direction. The raised height of each of the side blocks 21 from the surface of the sidewall portion 2 is, for example, from 3 mm to 8 mm. In a case where a portion, between the side blocks 21 adjacent to each other in the tire circumferential direction, which is not raised from the surface of the sidewall portion 2 is designated as a side groove 14, the side groove 14 may be present at a position to which the corresponding lug groove 13, which is provided in the shoulder region, extends.

In surfaces of the blocks thus formed (the side block 21, the shoulder block 22, and the center block 23), groove elements 31, 32, and 33 each including a narrow groove and/or a sipe are respectively provided. Specifically, each of the groove elements 31, 32, and 33 is one of a narrow groove having a groove width of from 2 mm to 8 mm and a groove depth of from 8 mm to 14 mm, a sipe having a groove width of from 0.4 mm to 2.0 mm and a groove depth of from 2.5 mm to 15 mm, or a composite groove formed by the narrow groove and the sipe coupled and combined.

The first groove element 31 provided in the surface of the side block 21 extends from the corresponding sidewall portion 2 toward the corresponding ground contact edge E. An end portion of the first groove element 31 closer to the sidewall portion 2 may terminate within the side block 21 or may open toward the sidewall portion 2. In the illustrated example, the first groove element 31 is a narrow groove. The second groove element 32 provided in the surface of the shoulder block 22 extends continuously from the first groove element 31 along a block surface from a side surface of the corresponding shoulder block 22 closer to the corresponding ground contact edge E to the road contact surface and communicates with the main groove 11. In the illustrated example, the second groove element 32 is a composite groove. The third groove element 33 provided in the surface of the center block 23 extends across the center block 23 and communicate with the main groove 11 or auxiliary groove 13. In the illustrated example, the third groove element 33 is a composite groove, and at one end communicates with the main groove 11 and at the other end communicates with the auxiliary groove 13. Instead of being individual independent grooves, the first groove elements 31, the second groove elements 32, and the third groove elements 33 form a set of lateral groove group 30 extending continuously from the side block 21 on a first side to the side block 21 on a second side in the tire lateral direction along the blocks across the main groove 11 or auxiliary groove 13.

The tread pattern based on the blocks as described above is provided with the set of lateral groove group 30 continuously extending from the side block 21 on the first side to the side block 21 on the second side in the tire lateral direction along the blocks. Thus, the tread pattern can ensure an edge effect by the set of lateral groove group 30 corresponding to an aggregate of first groove element 31, the second groove element 32, and the third groove element 33, allowing the running performance on unpaved roads to be improved. In this case, each of the groove elements 31, 32, and 33 includes a narrow groove or sipe having a sufficiently small groove area than the lug grooves 12 and the like, and thus does not become a factor increasing the groove area of the entire tread pattern or affect the tire performance under normal travel conditions. Thus, the running performance on unpaved roads can be efficiently enhanced.

In this case, in a case where the first to third groove elements 31, 32, and 33 are discontinuous, the edge effect of the set of lateral groove group 30 corresponding to the aggregate of the groove elements fails to be ensured, and sufficient running performance on unpaved roads is prevented from being delivered. In a case where, instead of the groove elements 31, 32, and 33 provided in the block surface (i.e., narrow grooves or sipes), grooves such as the lug grooves 12 which have a large groove width or a large groove depth extend continuously from the side block 23 on the first side to the side block 23 on the second side in the tire lateral direction, the tread portion 1 has an increased groove area, which may affect durability (wear resistance) and noise performance.

The aspect of the lateral groove group 30 is not particularly limited, but as in the illustrated example, the lateral groove groups 30 preferably includes a first lateral groove group 30A and a second lateral groove group 30B that have different overall shapes. The first lateral groove group 30A, extracted and illustrated in FIG. 3A, extends generally inclined in one direction with respect to the tire lateral direction. On the other hand, the second lateral groove group 30B, extracted and illustrated in FIG. 3B, is generally folded due to bending of the second groove element 32 or the third groove element 33 and includes a portion extending in the tire circumferential direction (in the illustrated example, the third groove element 33 is bent). By thus complicating the overall shape of the lateral groove group 30, the overall length of the set of lateral groove group 30 can be extended, and the number of lateral components or circumferential components can be increased. Accordingly, the edge effect can be more efficiently enhanced, and the running performance on unpaved roads can be improved.

In a case where the two types of lateral groove groups 30 are thus employed, the first lateral groove groups 30A and the second lateral groove groups 30B are preferably disposed alternately in the tire circumferential direction. Furthermore, as in the example of FIG. 2, the portion of the second lateral groove group 30B extending in the tire circumferential direction preferably intersects with the first lateral groove group 30A. Accordingly, the overall structure of the lateral groove group 30 is optimized, and this is advantageous for efficiently improving the running performance in the unpaved road. Note that, as in the illustrated example, the auxiliary groove 13 may be present at a position where the first lateral groove group 30A intersects with the second lateral groove group 30B and that not only does the first lateral groove group 30A intersect with the second lateral groove group 30B but the auxiliary groove 13 also intersects with the first lateral groove group 30A and the second lateral groove group 30B.

Preferably, in a case where the two types of lateral groove groups 30 are employed, the shoulder block 22 in which the second groove element 32 included in the first lateral groove group 30A is formed lies adjacent, in the tire circumferential direction, to the shoulder block 22 in which the second groove element 32 included in the second lateral groove group 30B is formed, these two shoulder blocks 22 form a pair, and the pairs of these shoulder blocks 22 are preferably repeatedly arranged in the tire circumferential direction. This allows imparting, to the shoulder blocks 22, of appropriate rigidity not only for the individual shoulder blocks but also for the shoulder block pairs, improving the balance between the shoulder blocks 22 and the lateral grooves 30 (second groove elements 32), and this is advantageous for efficiently enhancing the running performance on unpaved roads. In this case, an edge of one of the shoulder block 22 forming the pair may be chamfered into a recessed surface shape. Accordingly, those end portions of the shoulder blocks forming the pair which are located on a laterally outer side of the road contact surface are misaligned with each other to complicate the recess/protrusion shape near the ground contact edge E, and this is advantageous for efficiently enhancing the running performance in an unpaved road.

In a case where the two types of lateral groove groups 30 are employed, the side block 21 in which the first groove element 31 included in the first lateral groove group 30A is formed lies adjacent, in the tire circumferential direction, to the side block 21 in which the first groove element 31 included in the second lateral groove group 30B is formed, these two side blocks 21 form a pair, and the pairs of the side blocks 21 are arranged repeatedly in the tire circumferential direction. This allows imparting, to the side blocks 21, of appropriate rigidity not only for the individual side blocks but also for the side block pairs, improving the balance between the side blocks 21 and the lateral grooves 30 (first groove elements 31), and this is advantageous for efficiently enhancing the running performance on unpaved roads.

Preferably, in a case where the two types of lateral groove groups 30 are employed, as in the illustrated example, four center blocks 23 are disposed surrounding a position where the first lateral groove group 30A intersects with the second lateral groove group 30B, the four center blocks 23 form a group, and the groups of the center blocks 23 are repeatedly arranged in the tire circumferential direction. This allows imparting, to the center blocks 23, of appropriate rigidity not only for the individual center blocks but also for the groups of center blocks, improving the balance between the center blocks 23 and the lateral grooves 30 (third groove elements 33), and this is advantageous for efficiently enhancing the running performance on unpaved roads.

As described above, in a case where the aspect includes the pairs of shoulder blocks 22, the pairs of side blocks 21, and the groups of center blocks 23, the pair of shoulder blocks 22 may be adjacent to the pair of side blocks 21 in the tire lateral direction, and the pair of shoulder blocks 22 may be disposed misaligned with the group of the center blocks 21 in the tire circumferential direction. In other words, the side groove 14 located between the pairs of side blocks 21 adjacent in the tire circumferential direction may be disposed on an extension line of the lug groove 12 located between the pairs of shoulder blocks 22 adjacent in the tire circumferential direction, while the lug groove 12 that is included in the pair of shoulder blocks 22 and located between the pair of shoulder blocks 22 may be disposed on an extension line of the auxiliary groove 13 located between the groups of center blocks 23 adjacent in the tire circumferential direction. Accordingly, the positional relationship between the pair of shoulder blocks 22, the pair of side blocks 21, and the group of the center blocks 23 is optimized, and this is advantageous for efficiently enhancing the running performance in the unpaved road.

The specific shape of each side block 21 is not particularly limited, but as illustrated, each side block 21 on the first side and each side block 21 on the second side in the tire lateral direction preferably have different shapes. For example, in the illustrated example, on the first side in the tire lateral direction, the side grooves 14 each extending continuously from the corresponding lug groove 12 in the shoulder region and opening toward the corresponding sidewall portion 2 are arranged repeatedly and alternately with the side grooves 14 each extending continuously from the corresponding lug groove 12 in the shoulder region and being terminated and surrounded by the side blocks 21. Thus, the side blocks 21 are provided each of which has a size corresponding to the pair of shoulder blocks 22 adjacent in the tire circumferential direction. On the second side in the tire lateral direction, only the side grooves 14 are provided that extend continuously from the corresponding lug groove 12 in the shoulder region and open toward the corresponding sidewall portion 2, and the side blocks 21 are provided each of which has a size corresponding to each individual shoulder block 22. Accordingly, each side block 21 on the first side and each side block 21 on the second side differ in the manner of contact with the road surface (the manner of biting into the road surface), and this acts effectively on irregular recesses and protrusions on unpaved road surfaces and is advantageous for efficiently enhancing the running performance on unpaved roads. Additionally, the first side and the second side in the tire lateral direction differ in design in a side view, and thus changing a mounting direction with respect to the vehicle enables selection from two types of designs according to a user's preference. This is advantageous in terms of decoration.

As described above, each of the groove elements 31, 32, and 33 in an embodiment of the present technology is one of a sipe, a narrow groove, and a composite groove, but preferably, as in the illustrated example, the second groove element 32 and the third groove element 33 are composite grooves. Preferably, in each of the composite grooves 32 and 33, a sipe is disposed closer to the tire equator CL, and a narrow groove is disposed outward in the tire lateral direction. Accordingly, in a case where the lateral groove group 30 is traced from the side block 21 on the first side to the side block 21 on the second side, the sipes and the narrow grooves, having different groove forms, are alternately repeated, complicating the overall shape of the lateral groove group 30, and this is advantageous for efficiently enhancing the running performance on unpaved roads.

An embodiment of the present technology enhances the running performance on unpaved roads by providing the lateral groove groups 30 described above, and thus, stud pins may be specified to be added in order to further improve performance. Specifically, the shoulder block 22 or the side block 21 may be provided with a hole 40 in which a stud pin may be embedded. Accordingly, stud pins can be inserted, and the addition of the stud pins allows the running performance on unpaved roads to be further improved.

EXAMPLES

Pneumatic tires of 11 types according to Comparative Example 1 to 4 and Examples 1 to 7 were manufactured. The tires have a tire size of LT265/70R17 121Q and have a basic structure illustrated in FIG. 1. The tires are based on the tread pattern illustrated in FIG. 2 and set for the presence of continuity of the lateral groove group, the aspect of the first to third groove elements, the type of the lateral groove group, the presence of intersect between the lateral groove groups, the presence of the side block pair, and the presence of the shoulder block pair as indicated in Table 1.

For the presence of continuity of the lateral groove group, whether the first groove element and the second groove element on the first side are continuous or discontinuous is indicated in the section of "first/second (first side)" of "continuity of lateral groove group" in Table 1, whether the second groove element and the third groove element on the first side are continuous or discontinuous is indicated in the section of "second/third (first side)" of "continuity of lateral groove group" in Table 1, whether the third groove element and the second groove element on the second side are continuous or discontinuous is indicated in the section of "third/second (second side)" of "continuity of lateral groove group" in Table 1, and whether the second groove element and the first groove element on the second side are continuous or discontinuous is indicated in the section of "second/first (second side)" of "continuity of lateral groove group" in Table 1.

For the aspect of the first to third groove elements, whether the groove element is a narrow groove, a sipe, or a composite groove is indicated in each of the sections of "First groove element" "Second groove element" "Third groove element" in Table 1. Note that, in Comparative Example 4, as groove elements, grooves are provided that have a groove width and a groove depth similar to the groove width and groove depth of lug grooves and thus that, for Comparative Example 4, "lug groove" is indicated for convenience.

Figure 3A:
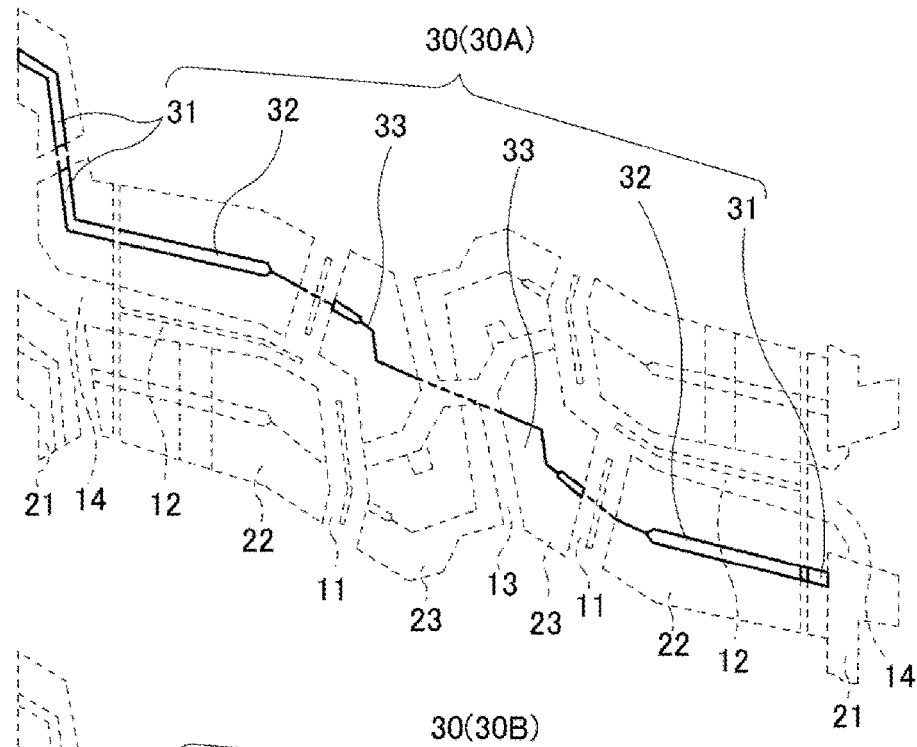
FIGS. 3A and 3B are explanatory diagrams schematically illustrating examples of lateral groove groups according to an embodiment of the present technology.
Figure 3B:
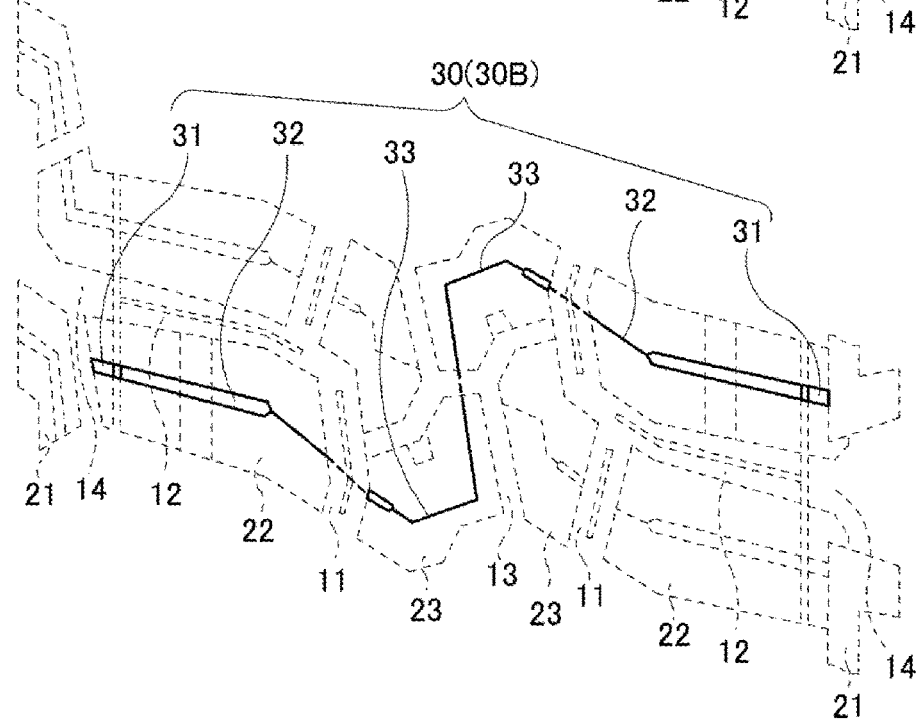

For the type of the lateral groove group, a case where only the first lateral groove groups in FIG. 3A are provided is designated as "only first", a case where only the second lateral groove groups in FIG. 3B are provided is designated as "only second", and a case where both the first lateral groove groups and the second lateral groove groups are provided is designated as "two types". Note that, in Comparative Examples 1 to 4, groove elements are provided that are inclined in an orientation similar to the orientation of the first lateral groove group in FIG. 3A and thus that, for Comparative Examples 1 to 4, parenthesized "first" is indicated for reference.

Regarding the presence of the side block pair and the presence of the shoulder block pair, as illustrated in FIG. 2, a case where the side block pair or the shoulder block pair is present is indicated as "Yes", and a case where side blocks or shoulder blocks with the same shape are repeatedly arranged is indicated as "No".

These pneumatic tires are evaluated for startability and durability using evaluation methods described below. The results are also indicated in Table 1.

Startability

The test tires is assembled on wheels having a rim size of 17×8J, inflated to an air pressure of 350 kPa, and mounted on a test vehicle (four wheel drive SUV (sport utility vehicle)). Sensory evaluation for startability by a test driver is performed on a test track including unpaved roads (gravel road surfaces). Evaluation results are expressed as index values, with the value of Comparative Example 1 expressed as an index value of 100. Larger index values indicate that startability on unpaved roads is more excellent. Note that an index value of "101" means that there is no substantial difference from Comparative Example 1, used as a reference, and that the effect improving the starting performance is not sufficiently obtained.

Durability

The test tires is assembled on wheels having a rim size of 17×8J, inflated to an air pressure of 350 kPa, and mounted on a test vehicle (four wheel drive SUV). The amount of wear is measured after traveling a distance of 1000 km on a test track including unpaved roads. The evaluation results are expressed as index values corresponding to reciprocals of measurement values, with Comparative Example 1 being assigned the value of 100. Larger index values indicate smaller amount of wear and more excellent durability.

TABLE 1-1

|  |  | Comparative Example 1 | Comparative Example 2 | Comparative Example 3 | Comparative Example 4 |
|---|---|---|---|---|---|
| Continuity of Lateral | First/Second (First Side) | Discontinuous | Continuous | Discontinuous | Continuous |

TABLE 1-1-continued

|  |  | Comparative Example 1 | Comparative Example 2 | Comparative Example 3 | Comparative Example 4 |
|---|---|---|---|---|---|
| Groove Group | Second/Third (First Side) | Discontinuous | Discontinuous | Continuous | Continuous |
|  | Third/Second (Second Side) | Discontinuous | Discontinuous | Continuous | Continuous |
|  | Second/First (Second Side) | Discontinuous | Continuous | Discontinuous | Continuous |
| First Groove Element | | Narrow groove | Narrow groove | Narrow groove | Lug groove |
| Second Groove Element | | Narrow groove | Narrow groove | Narrow groove | Lug groove |
| Third Groove Element | | Narrow groove | Narrow groove | Narrow groove | Lug groove |
| Type of Lateral Groove Group | | (First) | (First) | (First) | (First) |
| Intersect Between Lateral Groove Groups | | Yes | Yes | Yes | Yes |
| Side Block Pair | | Yes | Yes | Yes | Yes |
| Shoulder Block Pair | | Yes | Yes | Yes | Yes |
| Startability | Index Value | 100 | 101 | 101 | 105 |
| Durability | Index Value | 100 | 100 | 100 | 90 |

TABLE 1-2

|  |  | Example 1 | Example 2 | Example 3 | Example 4 |
|---|---|---|---|---|---|
| Continuity of Lateral Groove Group | First/Second (First Side) | Continuous | Continuous | Continuous | Continuous |
|  | Second/Third (First Side) | Continuous | Continuous | Continuous | Continuous |
|  | Third/Second (Second Side) | Continuous | Continuous | Continuous | Continuous |
|  | Second/First (Second Side) | Continuous | Continuous | Continuous | Continuous |
| First Groove Element | | Narrow groove | Narrow groove | Sipe | Narrow groove |
| Second Groove Element | | Composite groove | Narrow groove | Sipe | Composite groove |
| Third Groove Element | | Composite groove | Narrow groove | Sipe | Composite groove |
| Type of Lateral Groove Group | | Two types | Two types | Two types | Only first |
| Intersect Between Lateral Groove Groups | | Yes | Yes | Yes | No |
| Side Block Pair | | Yes | Yes | Yes | Yes |
| Shoulder Block Pair | | Yes | Yes | Yes | Yes |
| Startability | Index Value | 103 | 104 | 102 | 102 |
| Durability | Index Value | 102 | 100 | 103 | 102 |

TABLE 1-3

|  |  | Example 5 | Example 6 | Example 7 |
|---|---|---|---|---|
| Continuity of Lateral Groove Group | First/Second (First Side) | Continuous | Continuous | Continuous |
|  | Second/Third (First Side) | Continuous | Continuous | Continuous |
|  | Third/Second (Second Side) | Continuous | Continuous | Continuous |
|  | Second/First (Second Side) | Continuous | Continuous | Continuous |
| First Groove Element | | Narrow groove | Narrow groove | Narrow groove |
| Second Groove Element | | Composite groove | Composite groove | Composite groove |
| Third Groove Element | | Composite groove | Composite groove | Composite groove |
| Type of Lateral Groove Group | | Only second | Two types | Two types |
| Intersect Between Lateral Groove Groups | | No | Yes | Yes |
| Side Block Pair | | Yes | No | Yes |

TABLE 1-3-continued

|  |  | Example 5 | Example 6 | Example 7 |
|---|---|---|---|---|
| Shoulder Block Pair |  | Yes | Yes | No |
| Startability | Index Value | 102 | 103 | 103 |
| Durability | Index Value | 102 | 102 | 102 |

As can be seen from Table 1, all of Examples 1 to 7 have improved startability and durability compared to Conventional Example 1. Note that only the startability on the gravel road surface is evaluated but that even in a case of traveling on other unpaved roads (mud roads, snowy roads, or the like), the tire according to an embodiment of the present technology acts effectively on mud, snow, or the like on the road surface and thus that excellent starting performance can be delivered on any unpaved roads.

On the other hand, in Comparative Examples 2 and 3, while a part of the lateral groove group is continuous, the lateral groove group is not continuous over the entire width from the side block on the first side to the side block on the second side, and thus a sufficient effect improving startability on unpaved roads is not obtained. In Comparative Example 4, the first to third groove elements have excessively large groove widths and depths and significantly increased groove areas, thus reducing the rigidity of the tread portion to degrade the durability.

The invention claimed is:

1. A pneumatic tire comprising a tread portion extending in a tire circumferential direction and having an annular shape, a pair of sidewall portions disposed on both sides of the tread portion, and a pair of bead portions disposed inward of the sidewall portions in a tire radial direction, wherein the tread portion is provided with a pair of main grooves located on both sides of a tire equator and extending in the tire circumferential direction, lug grooves extending outward from each of the pair of main grooves in a tire lateral direction beyond a ground contact edge defining, into a plurality of shoulder blocks, a corresponding one of land portions located outward of the pair of main grooves in the tire lateral direction, and auxiliary grooves defining a land portion between the pair of main grooves into a plurality of center blocks, the tread portion is also provided with a plurality of side blocks formed raised from a surface of each of the pair of sidewall portions at positions adjacent to and outward of the shoulder blocks in the tire lateral direction, surfaces of the side blocks are provided with first groove elements each comprising a narrow groove and/or a sipe, surfaces of the shoulder blocks are provided with second groove elements each comprising a narrow groove and/or a sipe, and surfaces of the center blocks are provided with third groove elements each comprising a narrow groove and/or a sipe, each of the first groove elements extends from a corresponding sidewall portion toward the ground contact edge, each of the second groove elements extends continuously from the first groove elements and from a side surface of a corresponding shoulder block closer to the ground contact edge toward a road contact surface to communicate with the main groove, and each of the third groove elements extends across a corresponding center block to communicate with a main groove of the pair of main grooves or an auxiliary groove, the first groove elements and the second groove elements and the third groove elements forming a lateral groove group extending continuously from the side block on a first side to the side block on a second side in the tire lateral direction along the blocks across the pair of main grooves or an auxiliary groove;

wherein the lateral groove group comprises a first lateral groove group and a second lateral groove group that have different overall shapes, the first lateral groove group extends generally inclined in one direction with respect to the tire lateral direction, and the second lateral groove group is generally folded due to bending of second groove elements or the third groove elements and comprises a portion extending in the tire circumferential direction.

2. The pneumatic tire according to claim 1, wherein the first lateral groove groups and the second lateral groove groups are disposed alternately in the tire circumferential direction, and a portion of the second lateral groove group that extends in the tire circumferential direction intersects with the first lateral groove group.

3. The pneumatic tire according to claim 2, wherein a shoulder block in which the second groove element comprised in the first lateral groove group is formed lies adjacent, in the tire circumferential direction, to a shoulder block in which the second groove element comprised in the second lateral groove group is formed, these two shoulder blocks form a pair, and the pairs of the shoulder blocks are repeatedly arranged in the tire circumferential direction.

4. The pneumatic tire according to claim 3, wherein a side block in which the first groove element comprised in the first lateral groove group is formed lies adjacent, in the tire circumferential direction, to a side block in which the first groove element comprised in the second lateral groove group is formed, and these two side blocks form a pair, and the pairs of the side blocks are repeatedly arranged in the tire circumferential direction.

5. The pneumatic tire according to claim 4, wherein each of the side blocks on the first side in the tire lateral direction and each of the side blocks on the second side in the tire lateral direction have different shapes.

6. The pneumatic tire according to claim 5, wherein the second groove elements and the third groove elements are each composite grooves comprising a sipe and a narrow groove coupled together, and in each composite groove, the sipe is disposed closer to the tire equator, and the narrow groove is disposed outward in the tire lateral direction.

7. The pneumatic tire according to claim 6, wherein the shoulder blocks or the side blocks comprise a hole in which a stud pin is embedded.

8. The pneumatic tire according to claim 1, wherein a shoulder block in which the second groove element comprised in the first lateral groove group is formed lies adjacent, in the tire circumferential direction, to a shoulder block in which the second groove element comprised in the second lateral groove group is formed, these two shoulder blocks form a pair, and the pairs of the shoulder blocks are repeatedly arranged in the tire circumferential direction.

9. The pneumatic tire according to claim 1, wherein a side block in which the first groove element comprised in the first lateral groove group is formed lies adjacent, in the tire circumferential direction, to a side block in which the first groove element comprised in the second lateral groove group is formed, and these two side blocks form a pair, and the pairs of the side blocks are repeatedly arranged in the tire circumferential direction.

10. The pneumatic tire according to claim 1, wherein each of the side blocks on the first side in the tire lateral direction and each of the side blocks on the second side in the tire lateral direction have different shapes.

11. The pneumatic tire according to claim 1, wherein the second groove elements and the third groove elements are each composite grooves comprising a sipe and a narrow groove coupled together, and in each composite groove, the sipe is disposed closer to the tire equator, and the narrow groove is disposed outward in the tire lateral direction.

12. The pneumatic tire according to claim 1, wherein the shoulder blocks or the side blocks comprise a hole in which a stud pin is embedded.

\* \* \* \* \*